(12) United States Patent
Mathur et al.

(10) Patent No.: US 8,873,755 B2
(45) Date of Patent: Oct. 28, 2014

(54) ESTABLISHING SECURE LINKS BETWEEN WIRELESS DEVICES IN PROXIMITY USING AMBIENT WIRELESS SIGNALS

(75) Inventors: Suhas Mathur, Edison, NJ (US); Wade Trappe, Princeton, NJ (US); Alexander Varshavsky, Chatham, NJ (US)

(73) Assignees: AT&T Intellectual Propert I, L.P., Atlanta, GA (US); Rutgers, The State University of New Jersey, New Brunswick, NJ (US)

( * ) Notice: Subject to any disclaimer, the term of this patent is extended or adjusted under 35 U.S.C. 154(b) by 263 days.

(21) Appl. No.: 13/111,237

(22) Filed: May 19, 2011

(65) Prior Publication Data

US 2012/0294443 A1 Nov. 22, 2012

(51) Int. Cl.
H04L 9/00 (2006.01)
H04L 9/08 (2006.01)
H04W 12/04 (2009.01)

(52) U.S. Cl.
CPC ............. *H04L 9/0875* (2013.01); *H04W 12/04* (2013.01); *H04L 2209/80* (2013.01); *H04L 2209/34* (2013.01)
USPC ........................................................ 380/262

(58) Field of Classification Search
USPC ........................................................ 380/262
See application file for complete search history.

(56) References Cited

U.S. PATENT DOCUMENTS

| | | | |
|---|---|---|---|
| 8,086,242 B2* | 12/2011 | Kent et al. ................... | 455/452.2 |
| 8,090,101 B2* | 1/2012 | Ye et al. ........................... | 380/47 |
| 2004/0264588 A1* | 12/2004 | Song et al. .................... | 375/260 |
| 2009/0138707 A1* | 5/2009 | Sibert et al. ................... | 713/168 |
| 2010/0067701 A1* | 3/2010 | Patwari et al. ................ | 380/279 |
| 2011/0002323 A1* | 1/2011 | Siaud et al. ................... | 370/345 |
| 2011/0280397 A1* | 11/2011 | Patwar et al. .................. | 380/44 |

OTHER PUBLICATIONS

On the Effectiveness of Secret Key Extraction from Wireless Signal Strength in Real Environments Suman Jana, Sriram Nandha Premnath, Mike Clark, Sneha K. Kasera, Neal Patwari, Srikanth V. Krishnamurthy MobiCom'09, Sep. 20-25, 2009, Beijing, China. Copyright 2009 ACM 978-1-60558-702-8/09/09.*
Radio-telepathy: Extracting a Secret Key from an Unauthenticated Wireless Channel; Suhas Mathur, Wade Trappe, Narayan Mandayam, Chunxuan Ye, Alex Reznik; MobiCom'08, Sep. 14-19, 2008, San Francisco, California, USA.*
Amigo: Proximity-Based Authentication of Mobile Devices; Alex Varshaysky, Adin Scannell, Anthony LaMarca, and Eyal de Lara; UbiComp 2007, LNCS 4717, pp. 253-270, 2007.*
S. Mahur et al., "ProxiMate: Proximity-based Secure Pairing Using Ambient Wireless Signals," 2011, http://www.research.att.com/techdocs/TD_100449.pdf.
W. Diffie et al., "New Directions in Cryptography," IEE Trans. on Information Theory, vol. 22, No. 6, 1976, pp. 644-654.

(Continued)

Primary Examiner — Luu Pham
Assistant Examiner — James Turchen
(74) Attorney, Agent, or Firm — Hartman & Citrin LLC

(57) ABSTRACT

Wireless devices in proximity are securely paired with one another autonomously by generating a common cryptographic key directly from a time-varying wireless environment shared among the wireless devices. The shared key can be used by the wireless devices to authenticate each wireless device's physical proximity and then to facilitate confidential communication between the wireless devices. The algorithm used to create the shared key is secure against a computationally unbounded adversary and its computational complexity is linear in the size of the shared key.

20 Claims, 8 Drawing Sheets

(56) References Cited

OTHER PUBLICATIONS

A. Varshavsky, et al., "Amigo: Proximity-based Authentication of Mobile Devices," In Proceedings of UbiComp 2007: Ubiquitous Computing, 2007, pp. 253-270.
D. Liu et al., "Establishing pairwise keys in distributed sensor netowrks," Proceedings of the 10th ACM conference on Computer and Communications Security, ser. CCS '03; New York, NY, USA: ACM, 2003, pp. 52-61.
S. Jana et al., "On the effectiveness of secret key extraction from wireless signal strength in real environments," Proceedings of the 15th Annual International Conference on Mobile Computing and Networking (MobiCom '09), Sep. 2009, pp. 321-332.
A. Molisch, "Wireless Communications," Wiley-IEEE Press, 2011, p. 116.
G. Brassard et al., "Secret key reconciliation by public discussion," Advances in Crytology Proc.—Eurocrypt '93, Lecture Notes in Computer Science, vol. 765, pp. 410-423, 1994.
C.H. Bennett et al., "Privacy Amplification by Public Discussion," SIAM J. Comput., vol. 17, No. 2, 1988, pp. 210-229.
T.S. Rappaport, "Wireless Communications: Principles and Practice," Second Edition. Prentice Hall PTR., 2002, pp. 165-166.
S. Mathur et al., "WINLAB Technical Report Using Public RF Sources to Build Secure Associations between Wireless Devices in Proximity," 2010, http://www.winlab.rutgers.edy/~suhas/CliqueTR2010.pdf.
http://gnuradio.org GNU Radio—WikiStart—gnuradio.org, printed May 2, 2011.
T.M. Cover et al., "Elements of Information Theory," John Wiley, 1991.
Q. Wang et al., "A nearest-neighbor approach to estimating divergence between continuous random vectors," Int. Symp. on. Inform. Theory, 2006, pp. 242-246.
S. Mathur et al., "Radio-telepathy: Extracting a secret key from an unauthenticated wireless channel," Proc. of the 14th Annual Conference on Mobile Computing and Systems (MobiCom 2008), San Francisco, CA, Sep. 2008.
C. Ye et al., "Information-theoretically secret key generation for fading wireless channels," Accepted for publication at the IEEE Trans. on Information Forensics and Security, Jun. 2010, preprint available at http://arxiv.org/abs/0910.5027, 2010.
B. Azimi-Sadjadi et al., "Robust key generation from signal envelopes in wireless networks," CSS '07: Proceedings of the 14th ACM conference on Computer and Communications Security, 2007, pp. 401-410.
A. Kalamandeen et al., "Ensemble: Cooperative proximity-based authentication," Proceedings of the 8th International Conference on Mobile Systems, Applications and Services. New York, NY, USA: ACM, 2010, pp. 331-344.
R. Mayrhofer et al., "Shake well before use: Intuitive and secure pairing of mobile devices," IEEE Transactions on Mobile Computing, vol. 8, No. 6, 2009, pp. 792-806.
D. Bichleri et al., "Key generation based on acceleration data of shaking processes," Ubiquitous Computing 2007, 2007, pp. 304-317.
http://www.nfc-forum.org/ "Near field communications forum," printed May 2, 2011.
J. Wright et al., "Dispelling Common Bluetooth Misconceptions," SANS Technology Institute Security Laboratory, Sep. 19, 2007.
E. Haselsteiner et al., "Security in near field communication (NFC)," Workshop on RFID Security RFIDSec, 2006.

\* cited by examiner

ESTABLISHING SECURE LINKS BETWEEN WIRELESS DEVICES IN PROXIMITY USING AMBIENT WIRELESS SIGNALS

BACKGROUND

This application relates generally to establishing secure links between wireless devices and, more particularly, to establishing secure links between devices in proximity using ambient wireless signals.

The number of devices with wireless interfaces is growing at an increasingly rapid pace. This growth drives the need for devices to interact as they move about and come in proximity of one another. For example, two people meeting for the first time may wish to exchange data between their wireless devices, or a passenger at a train station may wish to pay for a ticket by having their mobile phone interact with an electronic ticket booth. Securing such interactions from malicious adversaries is an important and challenging problem.

Due to the broadcast nature of the wireless medium, it is difficult to ascertain if a wireless device is really interacting with another wireless device with which the wireless device intends to interact, especially if the wireless device has never encountered the other wireless device before. As a result, setting up a secure link between wireless devices in proximity is presently a cumbersome procedure that often requires significant human intervention in the form of entering a shared key on both devices. Moreover, with the global trend toward miniaturization and increased variety of device form factors, the devices may not have a common set of hardware components required for setting a human-supported secure association. For instance, the devices may or may not have one or more screens, physical buttons, light-emitting diodes ("LEDs"), sensors (e.g., accelerometers), radio frequency identification ("RFID") chips, and/or near-field communication ("NFC") chips. The only hardware component that is guaranteed to be present on all interoperable wireless devices is a wireless radio.

Certain technologies demonstrate how the physical shaking of devices equipped with accelerometers can be used to authenticate devices. Unfortunately, this method requires the presence of accelerometers on devices and might be susceptible to attacks where an adversary replicates the shaking movement. Also, this method may not be appropriate in certain scenarios, such as authentication between a public display and a laptop computer. Finally, people have mistakenly used the short-range nature of some wireless technologies, such as BLUETOOTH and NFC, as a way to maintain security. Unfortunately, one cannot rely solely on the short-range nature of these short-range wireless technologies because they are susceptible to attacks by eavesdroppers with powerful, directional antennas. Thus, what is needed is a way to securely exchange information between wireless devices in close proximity without requiring special hardware such as accelerometers, NFC, or BLUETOOTH components.

The use of a common radio environment as a proof of physical proximity was first presented in a technology called Amigo. Amigo relies on the Diffie-Hellman protocol for a secret key exchange between two devices and then utilizes the received signal strength indicator ("RSSI") from WI-FI packets for a proof of physical proximity. The Diffie-Hellman protocol involves discrete modular exponentiation which is $O(n^3)$ in the size n of the desired key. Moreover, the reliance by Amigo on the Diffie-Hellman protocol implicitly assumes that an adversary is computational bounded. Since Amigo relies on a coarse-grained RSSI metric that measures the average received power in a packet preamble, it is relatively simple for an adversary to manipulate in a controlled manner.

It is with respect to these and other considerations that the disclosure made herein is presented.

SUMMARY

Aspects disclosed herein are directed to using the wireless radios present on all wireless devices to generate a cryptographic key at wireless devices that are within a given distance of one another. This cryptographic key can then be used to establish a secure link between the wireless devices over which to communicate potentially sensitive information, such as financial information, personal contact information, or any other information.

Aspects disclosed herein address the above-described shortcomings of Amigo. According to one aspect, an algorithm utilizes a linear code with a linear complexity of O(n). This is particularly useful in domains where the entities wishing to form a key have limited computational resources, such as is the case for sensor networks. According to another aspect, the algorithm extracts secret bits from a wireless channel itself and is therefore secure against even a computationally unbounded adversary. According to yet another aspect, instead of relying solely on WIFI, as is the case for Amigo, the algorithm can utilize any available radio technology. For example, the algorithm can utilize frequency modulation ("FM") radio and/or television ("TV") signals for secret key extraction. The algorithm also does not rely on individual packets and, instead, utilizes a continuous signal to measure a time-varying channel, thereby improving the speed at which common randomness can be harvested. According to still another aspect, the algorithm utilizes a finer-grained two-dimensional (i.e., amplitude and phase) channel measurements, which are not easy to manipulate in a controlled manner, as are course-grained RSSI metric utilized by Amigo.

As will be further described herein, wireless devices in physical proximity are able to convert correlated wireless channel measurements into an identical sequence of bits, which can then be used as a shared encryption key. As part of the algorithm that accomplishes this conversion, a novel encoding scheme referred to herein as "list-encoding" is also described. In addition, simultaneous monitoring of multiple radio frequency ("RF") sources is described to increase the rate at which secret bits can be extracted. For example, the algorithm can generate the equivalent of a 4-digit personal identification number ("PIN") used in BLUETOOTH systems within ~0.34 seconds with ten TV sources. The algorithm can also utilize the differential-phase of the received signals to protect against an adversary who controls a wireless source that is being used by co-located wireless devices for secret bit extraction.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore,

DETAILED DESCRIPTION

The following detailed description is directed to securely pairing wireless devices in proximity with one another autonomously by generating a common cryptographic key directly from a time-varying wireless environment shared among the wireless devices. The shared key can be used by the wireless devices to authenticate each wireless device's physical proximity and then to facilitate confidential communication between the wireless devices. The algorithm used to create the shared key is secure against a computationally unbounded adversary and its computational complexity is linear in the size of the shared key.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, mobile devices, wireless devices, multiprocessor systems, microprocessor-based or programmable consumer electronics, minicomputers, mainframe computers, and the like.

Figure 1:
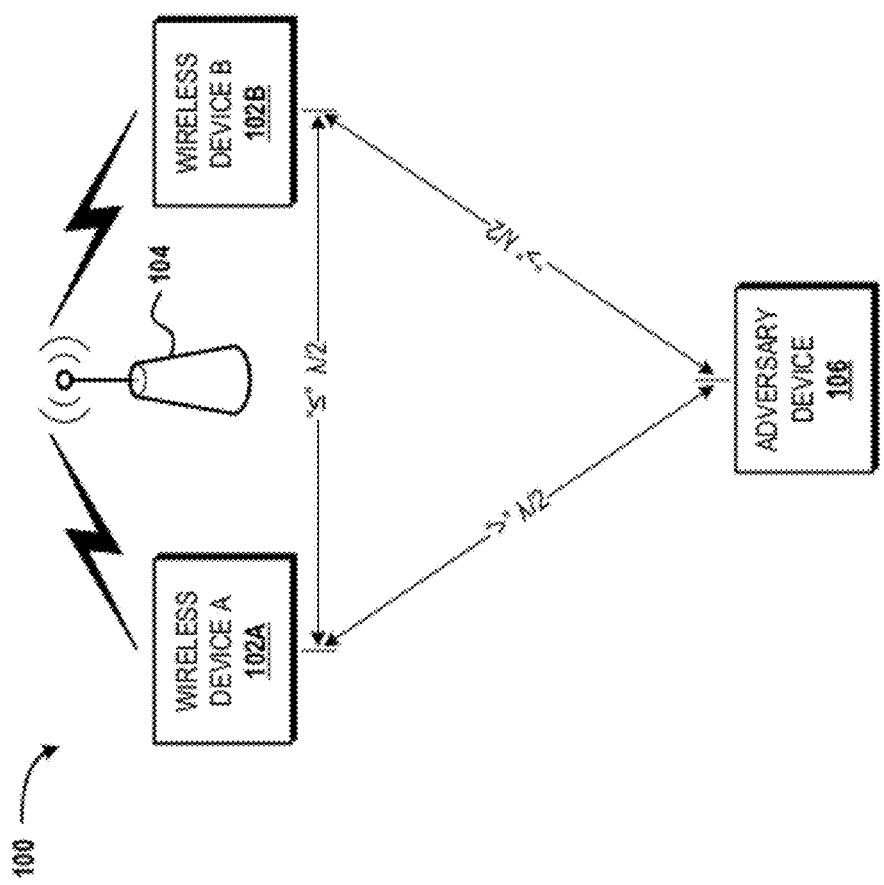
FIG. 1 is a system diagram schematically illustrating an exemplary operating environment for implementing various embodiments presented herein.

Referring now to FIG. 1, aspects of a system 100 for various embodiments presented herein will be described. The illustrated system 100 includes two wireless devices, wireless device A 102A and wireless device B 102B, which are located within close proximity. In the illustrated embodiment, close proximity is defined as a distance that is approximately less than or equal to $\lambda/2$, where $\lambda$ is the wavelength of a signal transmitted from a source 104. As is also illustrated, an adversary device 106 is located at a distance that is greater than $\lambda/2$ from the wireless device A 102A and the wireless device B 102B. The adversary device 106 may be autonomous or may be operated by an attacker attempting to acquire information from the wireless device A 102A and/or the wireless device B 102B, particularly during any communications among the wireless devices 102A, 102B. Moreover, the adversary device 106 may at least temporarily control the source 104 and may receive a signal transmitted from the source 104.

The wireless device A 102A and the wireless device B 102B are devices that include a wireless radio component configured to send and receive RF signals from the source 104. Other hardware components of the wireless devices 102A, 102B in addition to the wireless radio component are considered superfluous for the purposes of generating a shared key and effecting a secure link between the wireless devices 102A, 102B using the shared key in accordance with the embodiments described herein. That is, while the wireless devices 102A, 102B may include hardware components such as screens, buttons, NFC chips, RFID chips, and/or the like, these hardware components are not required to perform the functions described herein to generate a shared key and use the shared key to create a secure link between the wireless devices 102A, 102B.

Exemplary wireless devices 102A, 102B include devices capable of receiving RF signals from any radio technology utilized by the source 104. For example, the wireless devices 102A, 102B may be WIFI devices, cellular devices, frequency modulated ("FM") devices, television ("TV") tuner devices, combinations thereof, and/or the like. In some embodiments, the wireless device 102A is a mobile device such as a cellular telephone, personal digital assistant ("PDA"), tablet device, or the like operated by a user that desires to create a secure connection with the wireless device B 102B in order to exchange private information such as financial information, contact information, and/or any other information. In these embodiments, the wireless device B 102B may be a payment device in communication with or that is a point-of-sale ("POS") system, for example, a check-out system at a store to receive financial information (e.g., credit card, debit card, or other payment card information) as payment for goods and/or services rendered to the user. Alternatively, the wireless device B 102B also may be a mobile device with which the user of the wireless device A 102A (or a user of the wireless device B 102B) desires to exchange contact information such as name, telephone number, email address, mailing address, combinations thereof, and/or the like, and/or any other information. It is contemplated that either the wireless device A 102A or the wireless device B 102B can initiate establishment of a secure connection via the embodiments disclosed herein. The source 104 from which the wireless device 102A and the wireless device 102B receive RF signals, in some embodiments, includes a WIFI access point, a cellular network tower (e.g., a cellular base station and associated antennae), a radio tower, a television broadcast tower, combinations thereof, and/or the like. Moreover, although a single source 104 is illustrated, multiple sources are contemplated. In fact, as will be described in greater detail herein, the use of multiple RF sources is demonstrated to significantly increase the rate at which secret bits of a shared secret key can be extracted.

Figure 2:
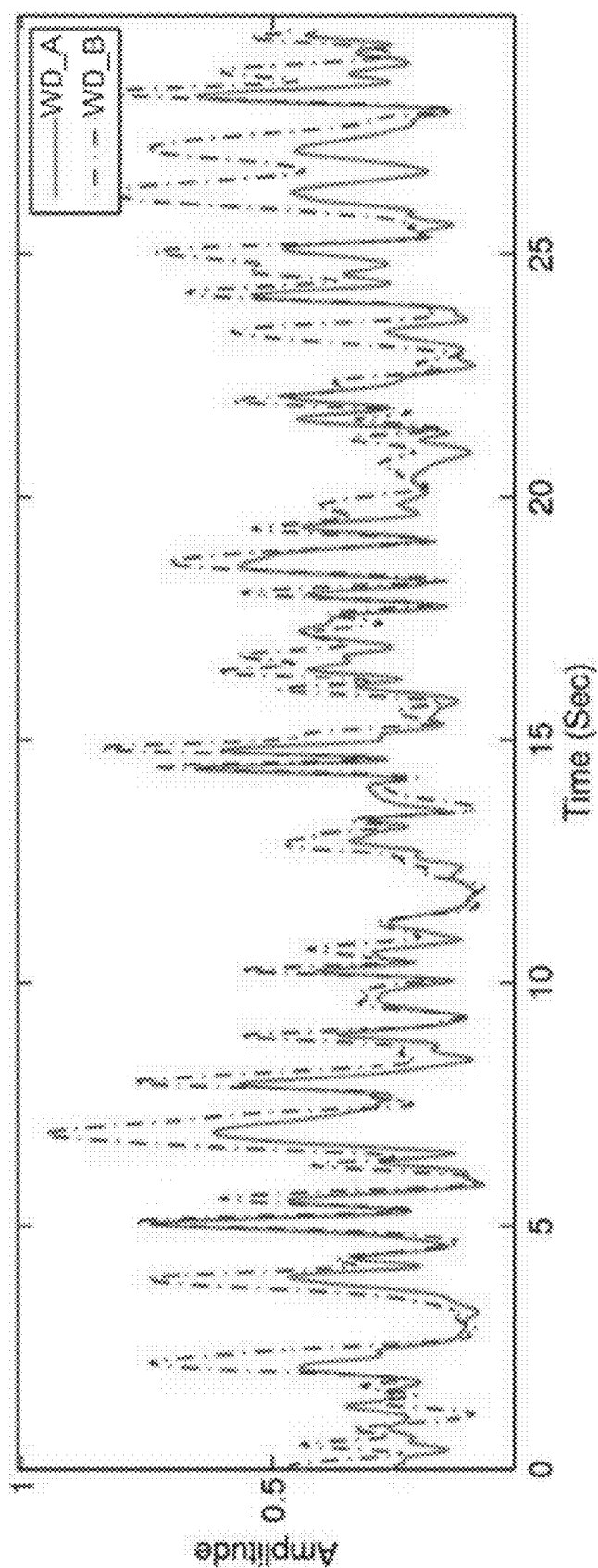
FIG. 2 is a graph showing a trace of the temporal channel variations observed at two wireless devices (i.e., wireless device A and wireless device B) tuned to a television broadcast frequency of 584.31 megahertz ("MHz") when the wireless devices are approximately 8 centimeters ("cm") apart, according to an exemplary embodiment.

In accordance with the various embodiments disclosed herein, since the wireless device A 102A and the wireless device B 102B are in close physical proximity to each other, the wireless device A 102A and the wireless device B 102B can derive a shared secret key directly from their common but continuously fluctuating radio environment. Derivation of a shared secret key is based upon an observation that the wireless devices 102A, 102B, in being in close physical proximity, perceive the same small-scale temporal variations in their wireless channels. FIG. 2 illustrates this observation. These small-scale temporal variations are referred to herein as small-scale fading effects. In contrast, an adversary device 106 that is located at a distance greater than $\lambda/2$ from the wireless device A 102A and the wireless device B 102B will perceive different small-scale temporal variations in its wireless channels than that of the wireless devices 102A, 102B. Accordingly, the adversary device 106 is unable to derive the same secret key.

The proximity at which two co-located devices (e.g., the wireless devices 102A, 102B) must reside in order to perceive common small-scale fading effects depends upon the wavelength of a particular RF transmission. In general, devices located closer than half a wavelength will perceive similar signal fluctuations, whereas a device that is located further than half a wavelength will perceive different small-scale fading effects, as in the illustrated embodiment. For example, the wavelengths of a 90 MHz FM Radio, 624 MHz TV, and 2.4 GHz wireless local area network ("WLAN") transmissions are 3.3 meters ("m"), 47 centimeters ("cm"), and 12.5 cm, respectively.

To further elaborate on the embodiment illustrated in FIG. 1, consider the wireless device A 102A as being associated with user A and the wireless device B 102B as being associated with user B. The users are interested in exchanging private information via compatible wireless radios of their respective wireless devices, without the adversary device 106 being able to decrypt their communication. This requires an authenticated and secure channel. In some embodiments, user A and user B do not know each other a priori. Therefore, user A cannot prove his or her identity to user B, or vice versa. User A and user B do, however, know that they are located in close physical proximity and can use this information for authentication.

Two primary thread models exist for the above-described scenario. First, the adversary device 106 can eavesdrop on all communications between the wireless device A 102A and the wireless device B 102B, and can attempt to authenticate with the wireless device 102A, pretending to be user A, or vice versa. Second, the adversary device 106, or an adversarial user (e.g., an attacker) associated therewith may control the source 104. In both of these cases, it is assumed that the adversary device 106 is located at a further distance from the wireless device A 102A and the wireless device B 102B than the wireless devices 102A, 102B are from each other. As will be demonstrated herein, in some embodiments, to reliably derive a shared secret key, the wireless device A 102A and the wireless device B 102B is located closer than approximately $0.1\lambda$ from each other, whereas an attacker (e.g., the adversary device 106) is located further than approximately $0.4\lambda$ from the wireless device A 102A and the wireless device B 102B. Other distances may be more or less reliable to derive a shared secret key, as will be understood by those skilled in the art upon reading the disclosure made herein.

Figure 3:
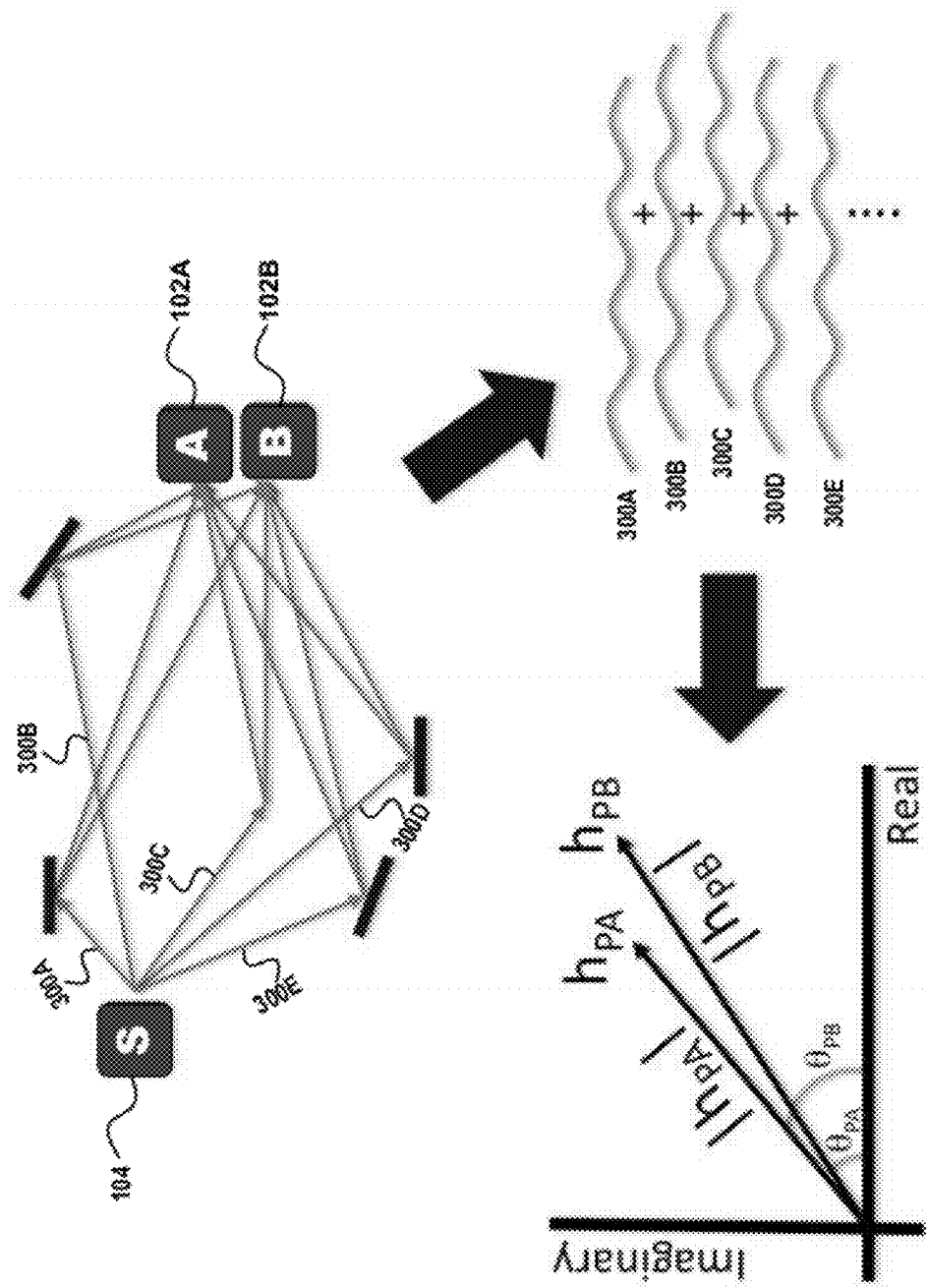
FIG. 3 is a diagram showing various wireless signals traveling along multiple paths to a destination and adding up to random amplitude and phase at the destination, according to an exemplary embodiment.

Embodiments disclosed herein assume that the wireless channel between the source 104 and the wireless devices 102A, 102B is a multi-path channel, consisting of many reflectors and scatterers. Many of the paths taken by the signals transmitted by the source 104 are time-varying due to the movement of people and objects, as well as varying atmospheric conditions. Even slight perturbations in the environment can generate significant signal fluctuations at the wireless radio receivers of the wireless devices 102A, 102B. This is the case for all terrestrial wireless transmission such as FM radio, TV, and cellular networks. The state of the wireless channel at any given time instant can be expressed as a complex number, representing amplitude and phase of the composite channel. An example of this is illustrated in FIG. 3, described briefly below. The received signal has an amplitude given by the product of the transmit signal's amplitude and the amplitude of the channel at that instant. The phase of the received signal is the sum of the phase of the transmit signal and the phase of the channel at that instant.

Turning briefly now to FIG. 3, various wireless signals 300A-300E originating from the source 104 are illustrated as traveling along multiple paths, adding up to a random amplitude and phase at the wireless devices 102A, 102B. A wireless channel can be represented as a two-dimensional vector resulting from the sum of many random two-dimensional vectors, each corresponding to a separate path from transmitter to receiver. If the wireless devices 102A, 102B are in proximity, the two-dimensional vectors corresponding to the wireless channel between the source 104 and the wireless devices 102A, 102B are correlated, as illustrated by FIG. 3.

The embodiments disclosed herein leverage two properties of a wireless channel. First, wireless channels received at two locations in close proximity are highly correlated. This correlation diminishes fast as the distance between the two locations increases, and typically vanishes completely beyond $\lambda/2$. Second, both the strength and the phase of the wireless channel vary randomly in time due to changes in reflectors and scatterers. The signal is highly correlated at times t and t+$\delta$, if $\delta$ is small. For example, in some embodiments, $\delta$ is smaller than the coherence time of the channel, which is typically in the order of 10s to 100s of milliseconds for indoor channels in the 100s MHz frequency range. The correlation vanishes as $\delta$ increases. The smallest $\delta$ for which the channel is statistically independent at times t and t+$\delta$ is referred to herein as the coherence time ($T_c$) of the wireless channel. In other words, the $T_c$ of the wireless channel indicates how often the wireless channel appears random again. Thus, samples of a signal at times t and t+$T_c$ are statistically independent.

Figure 4:
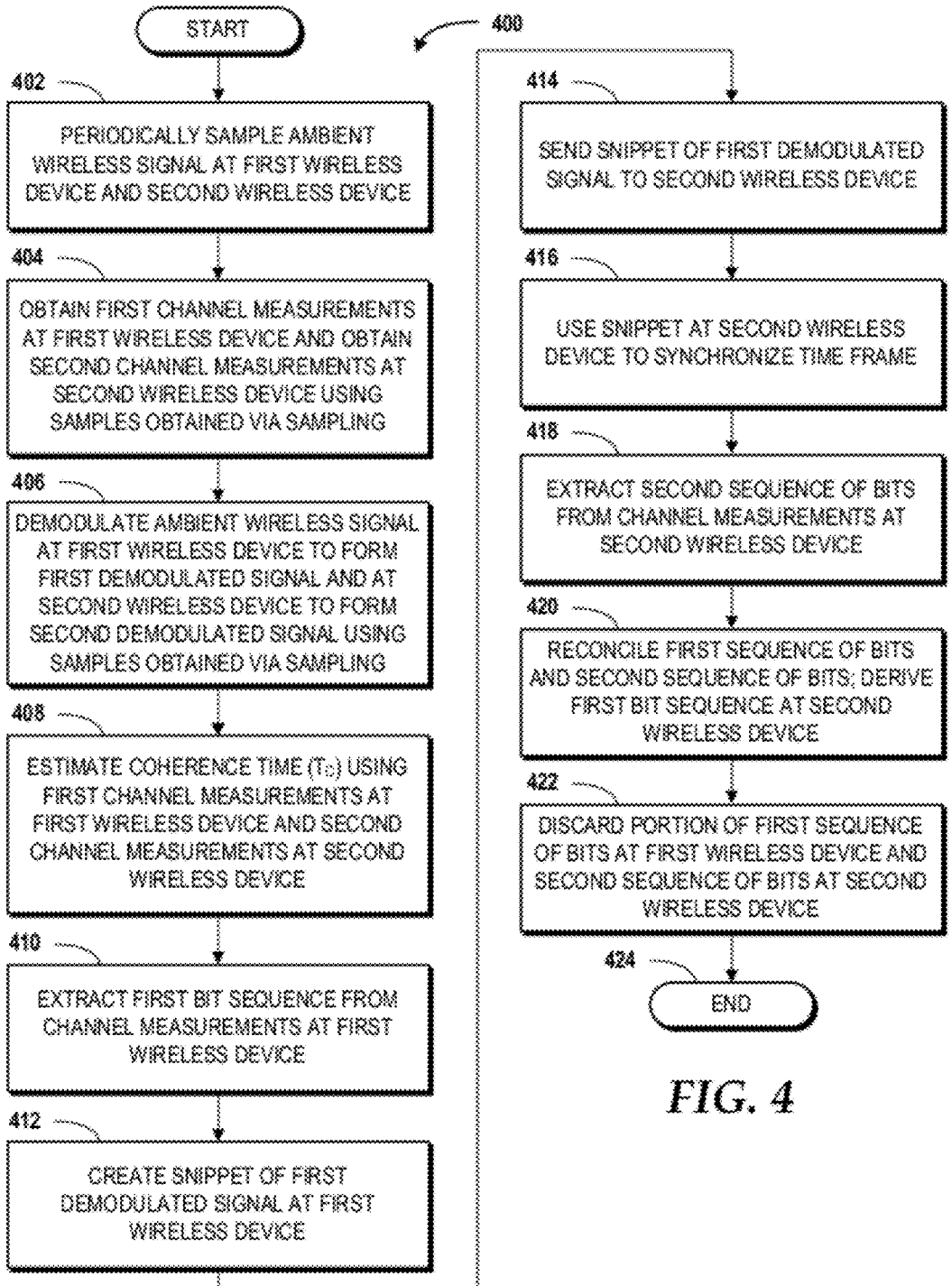
FIG. 4 is a flow diagram showing aspects of a method for extracting secret-bits from a general correlated quantity between two wireless devices using a quantization-based construction, according to an exemplary embodiment.

Turning now to FIG. 4, a method 400 for extracting secret-bits of a shared secret key from a general correlated quantity between the wireless devices 102A, 102B in close proximity (e.g., less than $\lambda/2$) will be described. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, wireless devices, mobile devices, minicomputers, mainframe computers, personal computers, hand-held computing devices, processor-based, programmable consumer electronics, combinations thereof, and the like. In particular, computer-readable instructions can be implemented on the wireless devices 102A, 102B.

Thus, it should be appreciated that the logical operations described herein are implemented (1) as a sequence of computer-implemented acts or program modules running on a computing system (e.g., the wireless device A 102A and/or the wireless device B 102B) and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

Table 1 below summarizes various notations used to describe the methods presented herein.

TABLE 1

Summary of the notation used herein.

| Symbol | Meaning |
|---|---|
| s(t) | Signal transmitted by the source 104. |
| $\underline{X}_U$ | Complex samples collected by U. U is, for example, the wireless device A 102A, the wireless device B 102B, or the adversary device 106. |
| $\underline{h}_{PU}$ | Complex channel measurements between the source 104 and U. |
| $Q_U$ | Quantizer threshold of U. |
| $\underline{S}_U$ | U's estimate of s(t) obtained by demodulating $\underline{X}_U$. |
| $\underline{K}_U$ | Result of quantizing $|\underline{h}_{PU}|$ with respect to $Q_U$. |
| C | An (n, k) linear block error correcting code. |
| $f_c(x)$ | n-bit codeword in C that is closest to n-bit sequence x. |
| P | Offset of $\underline{K}_A$ with respect to closest codeword in C. |

Underlined symbols indicate vectors.

The method 400 is performed based upon the observation that measurements of wireless channels between the source 104 and the wireless devices 102A, 102B in proximity are highly correlated. Channel measurements include amplitude and phase components. Since these components vary independently of one another but are correlated at the wireless device A 102A and the wireless device B 102B, secret bits can be extracted from both components separately. Extracting bits from phase has the advantage of being secure against a strong attacker who controls the source 104.

The method 400 begins and proceeds to operation 402, wherein the wireless devices 102A, 102B each periodically sample an ambient wireless signal received from the source 104. In some embodiments, each wireless device 102A, 102B samples the signal received from the source 104 every T seconds. Here, T is a fixed parameter and is chosen to be smaller than the expected approximate coherence time ($T_c$). The samples are stored into a time series $\underline{X}_u$ where u=the wireless device A 102A, the wireless device B 102B, or the adversary device 106. For example, $\underline{X}_A$ area the samples sampled by the wireless device A 102A. The samples $\underline{X}_u$ are used to measure the channel time series $\underline{h}_{PU}$ at operation 404. Since the wireless channel has both amplitude and phase, each element of the channel measurement vector $\underline{h}_{PU}$ is represented by a complex number. $\underline{h}_{PU}$ is the temporal variation of the amplitude portions of $\underline{h}_{PA}$ and $\underline{h}_{PB}$ as illustrated in FIG. 3. It should be understood that the samples $\underline{X}_u$ of the received signal are not the same as the channel measurements $\underline{h}_{PU}$. Instead, channel measurements are derived from the samples $\underline{X}_u$ of the received signal at operation 404. For example, if it is known that the transmit signal is of constant amplitude (fixed power), then the variation in the amplitude of the received signal $|\underline{X}_u|$ must be purely due to the variations in the wireless channel and can therefore be treated as $|\underline{h}_u|$.

From operation 404, the method 400 proceeds to operation 406, wherein the signal is demodulated at each wireless device 102A, 102B using the samples obtained in operation 402. In particular, from the samples $\underline{X}_u$, each wireless device 102A, 102B separately demodulates s(t), the signal transmitted by the source 104, to obtain the demodulated signal ($\underline{S}_u$), where u is either the wireless device A 102A or the wireless device B 102B. For example, if the source 104 is an FM radio transmitter, the demodulated signal is the audio signal on the FM station. The purpose of demodulating the signal is to use the demodulated signal to time-synchronize the wireless device A 102A and the wireless device B 102B, as is described in greater detail below with respect to operations 416.

From operation 406, the method 400 proceeds to operation 408, wherein a coherence time ($T_c$) is estimated for each wireless device 102A, 102B using the channel measurements ($\underline{h}_{PU}$) obtained at operation 404. In estimating the coherence time ($T_c$), it is assumed that the wireless channel adheres to the Rayleigh fading model for the effects of a propagation environment on a radio signal. Rayleigh fading is generally understood by those skilled in the art. The use of other statistical models by which to estimate the coherence time ($T_c$) is contemplated.

The coherence time ($T_c$) of a Rayleigh fading channel is related to the level crossing rate ("LCR") of the channel. The LCR is the rate at which channel amplitude crosses a specified level. For a Rayleigh fading channel, LCR is provided by the following equation:

$$\text{LCR} = \sqrt{2\pi} f_d \rho e^{-\rho^2} \qquad (1)$$

where ρ is the ratio between the level-crossing threshold considered and the root mean square amplitude, and $f_d$ is the Doppler spread. From this, the coherence time ($T_c$) can be estimated using the following equation:

$$T_c \approx \frac{1}{4f_d} = \frac{3\rho e^{-\rho^2}}{2\sqrt{2\pi}\,\text{LCR}}. \qquad (2)$$

By way of example and briefly referring to FIG. 2, the coherence time ($T_c$) of the channel being monitored is 0.22 seconds.

From operation 408, the method 400 proceeds to operation 410, wherein a bit sequence for the wireless device A 102A is extracted from the channel measurements obtained in operation 404. The exact mechanism for extracting the bit sequence from the channel measurements depends upon whether amplitude or phase is used for extracting bits, as will be described in greater detail herein. For purposes of explanation of the extraction operation 410, suppose the quantity that the wireless device A 102A and the wireless device B 102B are attempting to obtain bits from is stored as an array, $\underline{A}$, at the wireless device A 102A, and as an array, $\underline{B}$ at the wireless device B 102B. For the case of amplitude-based extraction, $\underline{A}=\underline{h}_{PA}$ and $\underline{B}=\underline{h}_{PB}$. For the case of phase-based extraction, $\underline{A}=\text{angle}(\underline{h}_{PA})$ and $\underline{B}=\text{angle}(\underline{h}_{PB})$. The arrays, $\underline{A}$ and $\underline{B}$, are illustrated in FIG. 3 for both amplitude-based extraction and phase-based extraction.

The wireless device A 102A and the wireless device B 102B separately compute the median of their measurements $\underline{A}$ and $\underline{B}$. The wireless device A 102A quantizes $\underline{A}$ once per $T_c$, using $Q_a$ as a quantizer threshold to extract one bit per $T_c$ to obtain bit sequence $K_a$. That is, the quantizer output for wireless device A 102A is a bit "1" if the value of an element in $\underline{A}$ is $<Q_a$ and "0" otherwise. The wireless device B 102B performs the same operations using $\underline{B}$ after synchronizing to a time-frame of reference of the wireless device A 102A, and obtains the bit sequence $K_b$, as will be described in greater detail below.

From operation 410, the method 400 proceeds to operation 412, wherein a snippet of the demodulated signal ($\underline{S}_a$) obtained at operation 406 is created at the wireless device A 102A. The snippet may be a portion of the demodulated signal ($\underline{S}_a$). The snippet is used to aid the wireless device B 102B in synchronizing to a time-frame of reference of the wireless device A 102A. For example, in the case of FM radio, the demodulated signal is demodulated audio with the understanding that the start of the snippet corresponds to time t=0 in the time-frame of reference of the wireless device A 102A. Other start times are contemplated.

From operation 412, the method 400 proceeds to operation 414, wherein the wireless device A 102A sends the snippet to the wireless device B 102B. After receipt of the snippet, at operation 416, the wireless device B 102B synchronizes to the time-frame of reference of the wireless device A 102A by correlating its demodulated signal ($\underline{S}_b$) with the snippet. The wireless device B 102B then extracts a bit sequence $\underline{K}_b$ at operation 418 in the same manner as the wireless device A 102A extracts the bit sequence $\underline{K}_a$ at operation 410. By the synchronization operation 416, the bit sequence $\underline{K}_b$ obtained by the wireless device B 102B corresponds to the same time instance as the bit sequence $\underline{K}_a$ obtained by the wireless device A 102A at operation 410.

After synchronization and quantization, the wireless device A 102A and the wireless device B 102B each have n-bit sequences, $\underline{K}_a$ and $\underline{K}_b$, respectively. $\underline{K}_a$ and $\underline{K}_b$ may differ at any given bit position with a probability $\epsilon$. Accordingly, $\underline{K}_a$ and $\underline{K}_b$ are reconciled at operation 420. The reconciliation operation 420 is used to repair the difference between $\underline{K}_a$ and $\underline{K}_b$, so that the wireless devices 102A, 102B end up with the same bit sequence for use as a shared secret key. The reconciliation operation 420 reduces the number of errors between $\underline{K}_a$ and $\underline{K}_b$, but it also reduces the number of common bits shared among the wireless devices 102A, 102B. Thus, the reconciliation operation 420 is a trade-off of bit-error rate $\epsilon$ with a bit-rate of the shared key.

In some embodiments, $\underline{K}_a$ and $\underline{K}_b$ are treated as distorted versions of some n-bit codeword of an (n, k) error-correcting code C. An (n, k) code C includes a one-to-one encoding function that maps any k-bit string to an n bit string (n>k), and a many-to-one decoding function that maps any n-bit string to one of $2^k$ n-bit sequences called "codewords" of C. In some embodiments, the error-correcting code C is stored at the wireless devices 102A, 102B prior to executing the operations of method 400. It is contemplated that the adversary device 106 may also know the error-correcting code C, but still be unable to ascertain the secret key shared among the wireless devices 102A, 102B.

Figure 5:
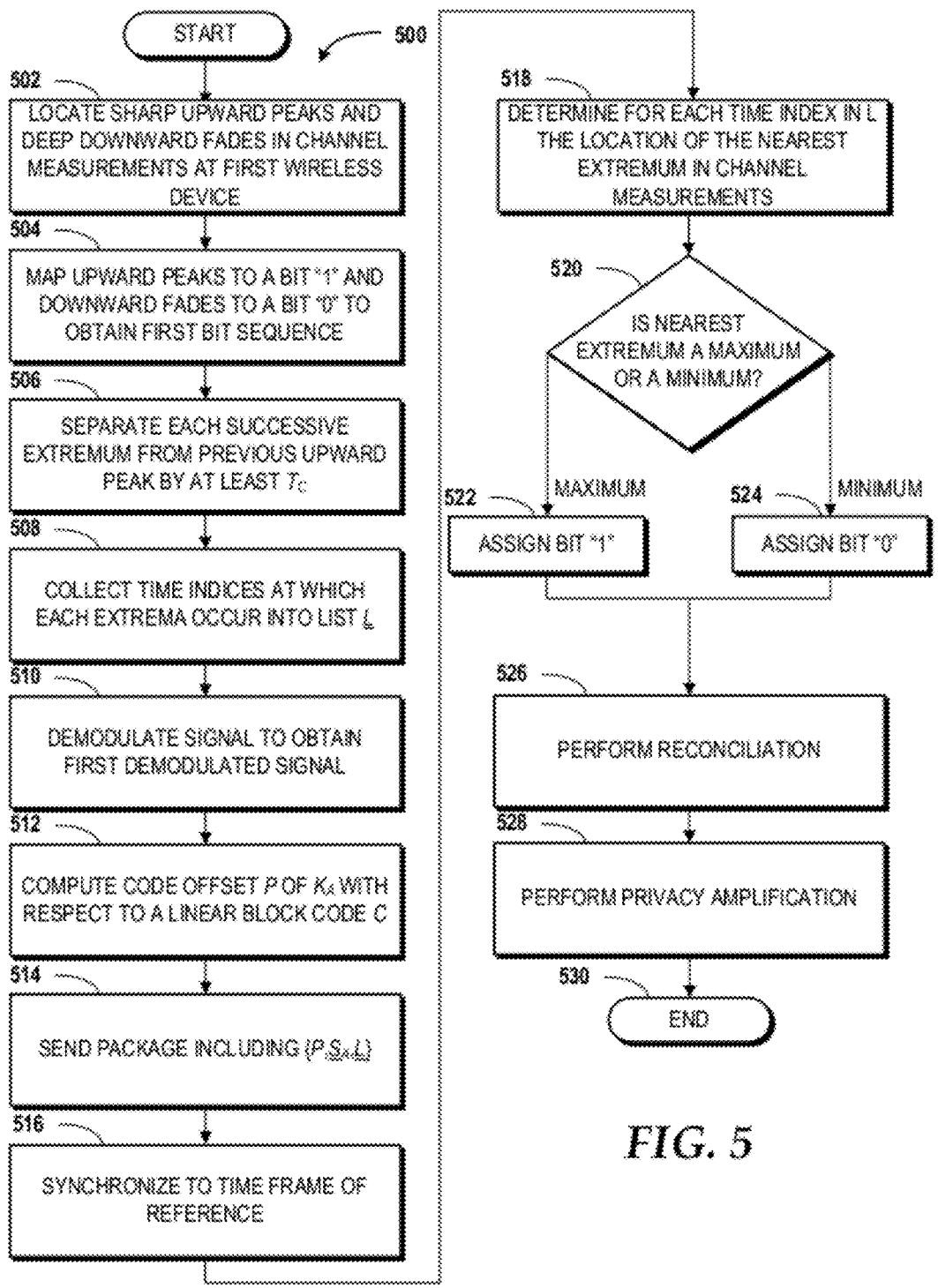
FIG. 5 is a flow diagram showing aspects of another method for extracting secret-bits from a general correlated quantity between two wireless devices using list-encoding, according to an exemplary embodiment.

As an example of the above, let $f_c(\cdot)$ be the decoding function of C that maps any n-bit sequence to the closest codeword of C. The wireless device A 102A first computes $f_c(\underline{K}_a)$ (i.e., the codeword in C that is closest to $\underline{K}_a$), and then computes the offset $P=\underline{K}_a-f_c(\underline{K}_a)$ (i.e., the bit-by-bit difference between this codeword and $\underline{K}_a$). The wireless device A 102A then sends the offset P to the wireless device B 102B in cleartext (i.e., not encrypted). If the value of $\epsilon$ is known (or an estimate thereof is known), a code with a suitable error correcting ability can be chosen to allow the wireless device B 102B to decode $\underline{K}_a$ using $\underline{K}_b$ and P by the following operation: $P+f_c(\underline{K}_b-P)$, which is equal to $P+f_c(\underline{K}_a)$ with high probability, which in turn equals $\underline{K}_a$ by the definition of P. Therefore, at the end of the reconciliation operation 420, both the wireless device A 102A and the wireless device B 102B know $\underline{K}_a$ with high probability. This construction is referred to herein as a "quantization-based construction." The quantization-based constructions is not suitable for use for extracting a secret key from the amplitude of channel measurements $h_u$, but is suitable for extracting the secret key from the phase. Extracting the secret key from the amplitude of channel measurements $h_u$ is described herein below with reference to FIG. 5.

Since the offset P is sent by the wireless device A 102A in the clear, the adversary device 106 can obtain partial information about the shared key, $\underline{K}_a$. That is, although the adversary device 106 cannot guess $\underline{K}_a$ by observing P alone, the adversary device 106 knows that $\underline{K}_a-P$=a valid codeword of C. The adversary device 106 can learn n−k bits of information about the bit sequences $\underline{K}_a$ and $\underline{K}_b$ by observing P. Therefore, in order to ensure that the shared key is not even partially known to the adversary device 106, in operation 422, the wireless devices 102A, 102B reduce the size of their respective bit sequences by n−k bits to obtain k-bit sequences, about which the adversary device 106 has absolutely no information. In some embodiments, this is accomplished using the k-bit pre-image of the n-bit codeword $f_c(\underline{K}_a)$, which both wireless devices 102A, 102B possess.

From operation 422, the method 400 proceeds to operation 424. The method 400 ends at operation 424. The method 400 has been described to explain how, in some embodiments, the wireless device A 102A and the wireless device B 102B extract an identical secret key from a correlated set of channel measurements.

The quantization-based construction described above has the problem that unless the bit-error rate $\epsilon$ between bits of $\underline{K}_a$ and $\underline{K}_b$ is extremely small (e.g., bit error rate<$10^{-4}$), the error-correcting code C needed to successfully reconcile the bit sequences $\underline{K}_a$ and $\underline{K}_b$ must be a very large block-length (e.g., n>1000). —The bit-error rate $\epsilon$ is related to the distance (d/λ) between the wireless device A 102A and the wireless device B 102B. For some values of d/λ, $\epsilon$ is moderately large (∼0.1-0.2). For example, when using an ATSC TV signal at 584.31 MHz (channel 33) and when the wireless devices 102A, 102B are only 1.5 inches apart, the resultant c is approximately equal to 0.15. Using a code C with a very large block-length n requires time in order for the wireless devices 102A, 102B to collect n-bit long $\underline{K}_a$ and $\underline{K}_b$. This time may be unacceptable for certain situations when time is of the essence. Accordingly, in the following description, it will be described how the bit-error rate c can be lowered for a given d/λ, by altering the way in which the wireless devices 102A, 102B obtain bits from channel measurements.

List-encoding can be used as an alternative to the quantization-based construction described above with reference to FIG. 4. List-encoding significantly lowers $\epsilon$ to a value suitable for use of error-correcting codes with a reasonably small block length n (e.g., n<50). Error-correcting codes with small block lengths n enable shorter time-intervals for pairing the wireless devices 102A, 102B.

List-encoding uses the relative minima and maxima in the temporal variations of $|\underline{h}_{PU}|$ to create bits at the wireless devices 102A, 102B instead of quantization with a threshold $Q_u$ in the quantization-based construction. A method 500 for extracting the secret key from amplitude measurements using list-encoding will now be described with reference to FIGS. 5 and 6.

Figure 6:
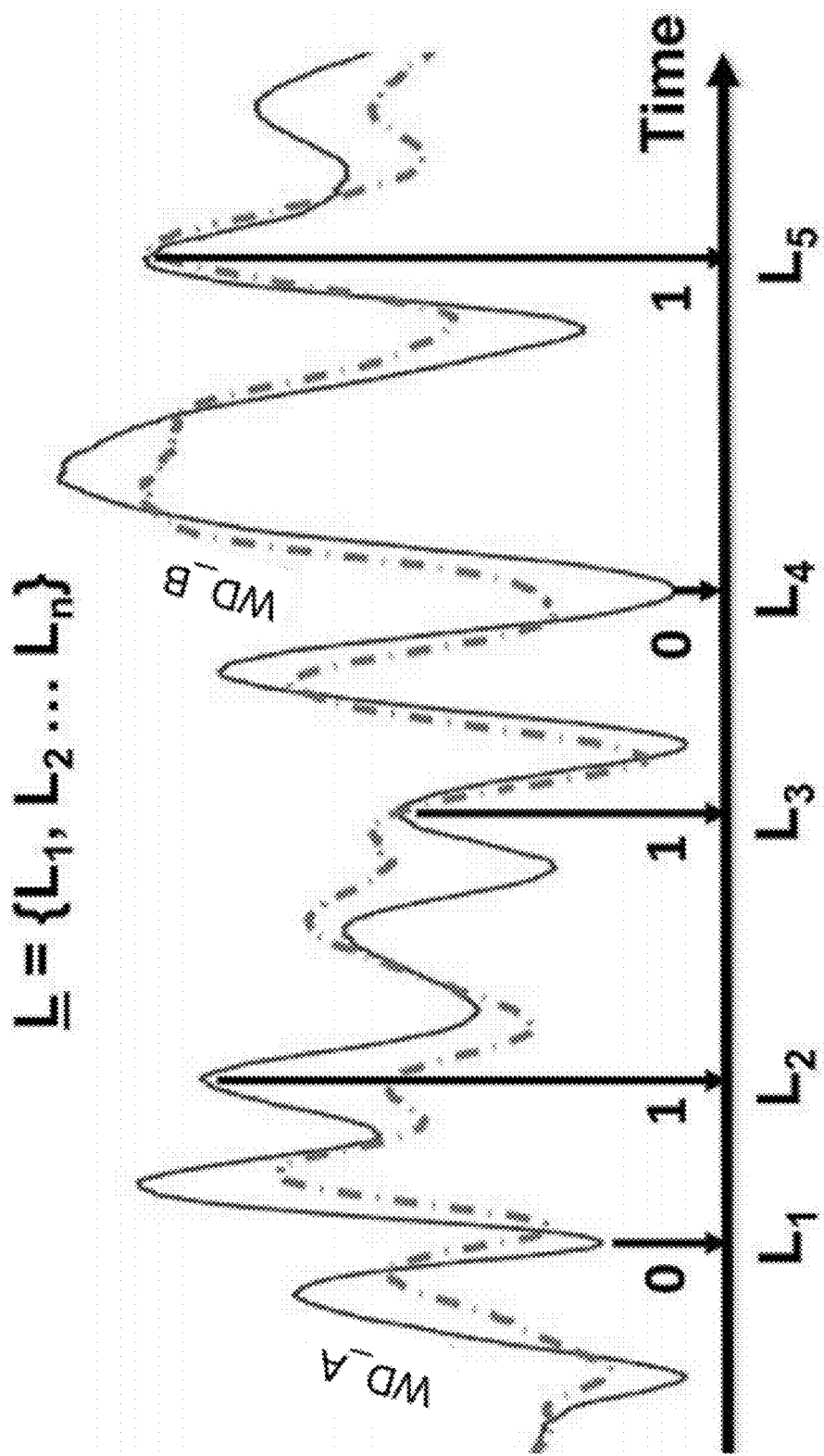
FIG. 6 is a diagram illustrating list-encoding, according to an exemplary embodiment.

The method 500 begins and proceeds to operation 502, wherein the wireless device A 102A locates sharp upward peaks and deep downward fades in the channel measurements obtained by the wireless device A 102A. An example of these upward peaks and downward fades in a sample of channel measurements is illustrated in FIG. 6.

From operation 502, the method 500 proceeds to operation 504, wherein the wireless device A 102A maps upward peaks to a bit "1" and downward fades to a bit "0" to obtain a bit sequence $\underline{K}_a$. From operation 504, the method 500 proceeds to operation 506, wherein the wireless device A 102A separates each successive extremum from the previous extremum by at least the coherence time $T_c$ to ensure that the bits in the extracted key are independent. The wireless device A 102A then, at operation 508, collects time indices at which each of these extrema occur and stores them in a list $\underline{L}$. This is best shown in FIG. 6, wherein discrete-time indices are shown as $L_i$, i=1, . . . n, the collection of which yields the list $\underline{L}=\{L_1, L_2, \ldots L_n\}$.

From operation 508, the method 500 proceeds to operation 510, wherein the wireless device A 102A demodulates a received signal in the same manner as described above with reference to operation 406 of FIG. 4 to obtain a demodulated signal $\underline{S}_a$. From operation 510, the method 500 proceeds to operation 512, wherein the wireless device A 102A computes a code offset P of $\underline{K}_a$ with respect to a known linear block code C. The code offset is computed in the same manner as described above.

From operation 512, the method 500 proceeds to operation 514, wherein the wireless device A 102A sends a package to the wireless device B 102B including $\{P, \underline{S}_a, \underline{L}\}$. The wireless device B 102B receives the package and, at operation 516, synchronizes to a time-frame of reference of the wireless device A 102A using $\underline{S}_a$. The wireless device B 102B then determines, at operation 518, for each time index in $\underline{L}$, the location of the nearest extremum in channel measurements $|\underline{h}_{PA}|$ is then determined, at operation 520, if the nearest extremum is a maximum or a minimum. If the nearest extremum is a maximum, the method 500 proceeds from operation 520 to operation 522, wherein the wireless device B 102B assigns the bit "1." If the nearest extremum is a minimum, the method 500 proceeds from operation 520 to operation 524, wherein the wireless device B 102B assigns the bit "0." The bit sequence $\underline{K}_b$ can be created in this manner until all time indexes have been considered.

From operations 522, 524, the method 500 proceeds to operation 526, wherein the wireless device B 102B performs reconciliation using P and $\underline{K}_b$ and knowledge of the code C in the same manner as described above with respect to the reconciliation operation 420 of FIG. 4. The method 500 then proceeds to operation 528, wherein the wireless device A 102A and the wireless device B 102B perform privacy amplification in the same manner as described above with respect to operation 422 of FIG. 4. The method 500 then proceeds to operation 530, wherein the method 500 ends.

It should be understood that even though the values of the channel measurements $\underline{h}_{PA}$ and $\underline{h}_{PB}$ at the wireless devices 102A, 102B are not necessarily better correlated at the location of extrema as determined at the wireless device 102A, the type of extrema (i.e., minimum or maximum) at the wireless device A 102A and the wireless device B 102B at these locations are in much better agreement, which lowers $\epsilon$.

Figure 7:
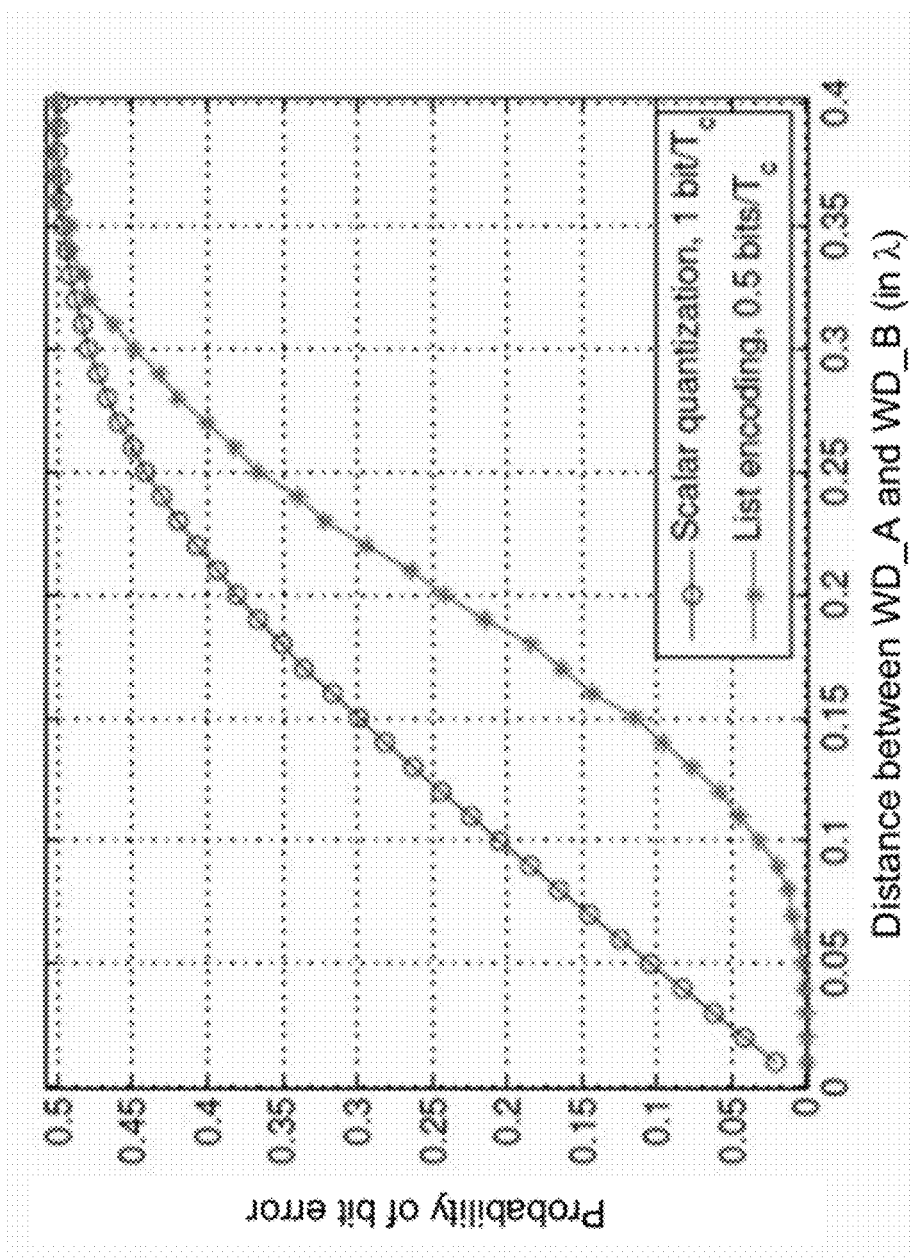
FIG. 7 is a diagram illustrating a bit-error rate between raw bits at two wireless devices for scalar quantization and for list-encoding, according to an exemplary embodiment.

List-encoding as described above has a subtle tradeoff. While in the method 400, the wireless devices 102A, 102B contribute one bit to $\underline{K}_a$ and $\underline{K}_b$, respectively, per $T_c$, using extrema in the manner described above reduces this to less than one bit per $T_c$. Therefore, the drop in $\epsilon$ comes as the cost of a drop in rate. The overall effect of list-encoding on rate after reconciliation, however, is that the improvement in $\epsilon$ due to list-encoding makes up for the drop in rate. FIG. 7 shows, via a graph created through simulation, the $\epsilon$ due to list-encoding and the c due to the scalar quantization (e.g., method 400), for different values of the distance between the wireless device A 102A and the wireless device B 102B. As shown in FIG. 7, the list-encoding results in a significantly lower $\epsilon$, but produces half the number of bits per $T_c$ generated by scalar quantization.

With regard to extracting bits from phase, it should be understood that the phase of the signal alone cannot be directly used for extracting bits at the wireless devices 102A, 102B because the measurement of phase also depends upon the phase of local oscillators ("LO") at both the transmitter and the receiver. The LOs are oscillators whose output combines received RF signals with a signal of a different frequency to produce frequencies equal to the sum of and the different between the original two signals. Since it is not pragmatic to assume phase synchronization between the LOs of the wireless device A 102A and the wireless device B 102B, the phase differential over a fixed time interval $\Delta$ is used, instead of the actual value of the phase to extract bits. $\Delta$ must be at least as large as $T_c$, so as to ensure that successive bits are independent. For extracting bits from phase, the differential phase values are used in place of the amplitude of $\underline{h}_{PU}$ in the quantization-based construction described above. The remaining algorithm as described above remains the same for phase-based extraction.

As briefly described above, the methods disclosed herein can be applied to monitoring multiple RF sources. By simultaneously monitoring multiple RF sources, the wireless devices 102A, 102B can increase the amount of common randomness available to them per unit time. In fact, the number of secret bits per second that is achievable scales linearly with the number of added sources, so long as the sources are physically separated by a distance of at least $\lambda/2$. In such a scenario, the wireless devices 102A, 102B can treat each signal source as an independent source of common randomness and run parallel instances of secret bit extraction in accordance with the extraction methods disclosed herein above.

As also briefly described above, the adversary device 106 may control the source 104 or the source itself may be adversarial. A powerful attacker (e.g., the adversary device 106) may be able to manipulate the amplitude of the signal received the wireless devices 102A, 102B in a controlled manner because the effect of the wireless channel on the transmit signal's amplitude is multiplicative—the amplitude of the received signal can be anywhere between 0 and up. That is, by increasing or decreasing the amplitude of a transmitted signal, an adversary can increase or decrease the amplitude of the received signal, respectively. In contrast, the effect of the wireless channel on the transmit signal's phase is additive, and the phase of the resultant received signal must lie between 0 and $2\pi$ as phase wraps around after $2\pi$. In this case, the adversary has no control over changes in the phase of the received signal. This observation is described in detail below with an example.

By way of example, suppose the adversary source (e.g., the source 104 as an adversary) transmits the signal, A(t) cos (2πf$_c$t+φ(t)) instead of transmitting a signal cos (2πf$_c$t). That is, the adversary inserts the multiplicative amplitude term A(t), and the additive phase term φ(t), both of which can be arbitrary functions of time. The receiver's channel estimate is then $$h(t)=H(t)A(t)\cdot e^{j(\phi(t)+\theta(t))} \qquad (3)$$

where H(t) is the true channel amplitude and φ(t) is the true channel phase at time t if the transmitter is not adversarial. The adversary has inserted A(t)e$^{j\phi(t)}$ in front of the true channel state H(t)e$^{j\Phi(t)}$, causing the channel to appear to have amplitude of A(t)H(t) and a phase of φ(t)+θ(t).

If the wireless devices 102A, 102B use only amplitude of their channels to extract bits, then an active adversary device 106 can vary A(t) to influence the bits extracted by the wireless devices 102A, 102B in a manner chosen by the adversary device 106, and would therefore possess some information about the extracted key. However, the phase θ(t) added by the channel, and hence the phase of the signal received at the wireless devices 102A, 102B φ(t)+θ(t) is not controlled by the adversary device 106. This is because phase is a number in the range 0 to 2π radians (i.e., 360 degrees), as phase wraps around to 0 after going beyond 2π.

Figure 8:
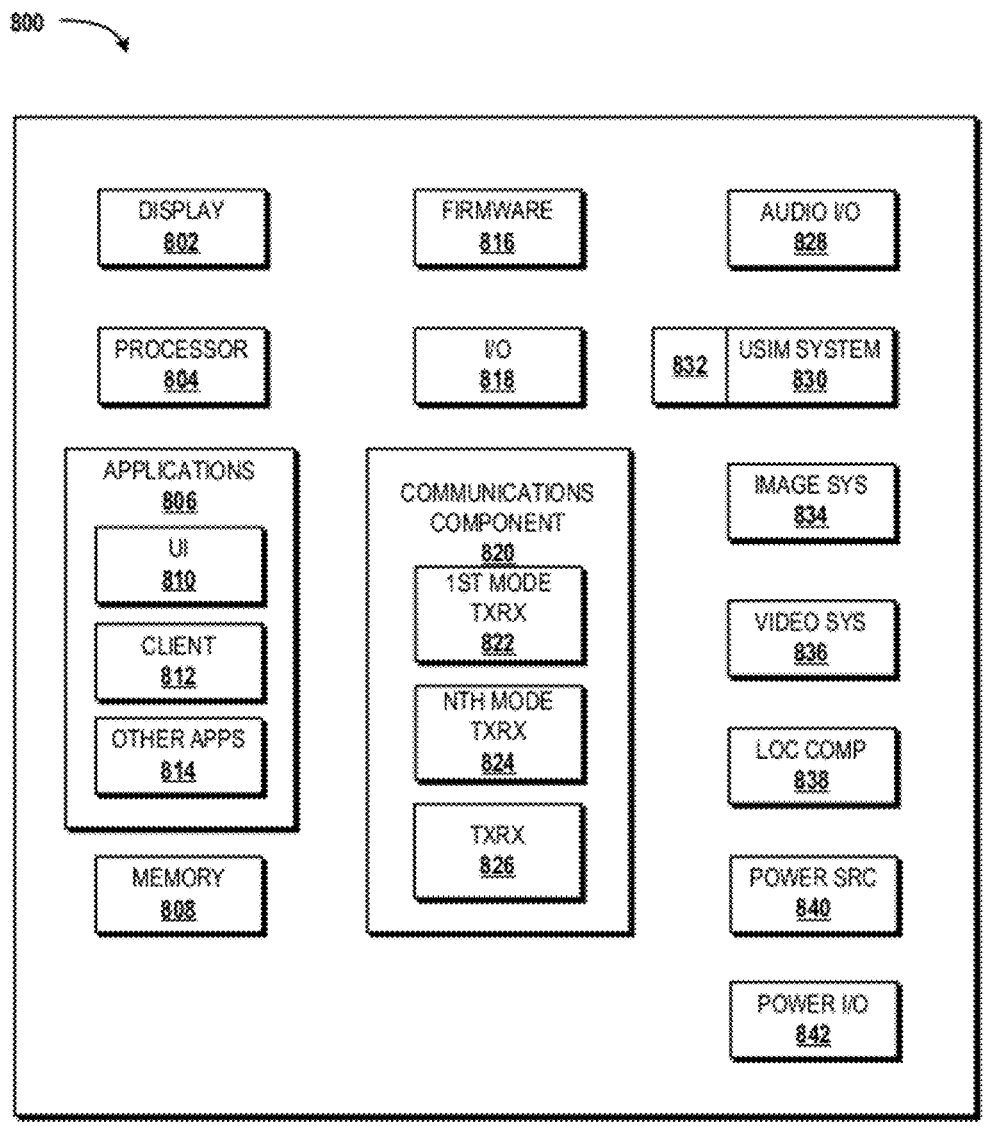
FIG. 8 is a mobile device architecture diagram illustrating an exemplary device hardware and software architecture for a mobile device capable of implementing aspects of the embodiments presented herein.

Turning now to FIG. 8, an exemplary mobile device ("MD") 800 and components thereof will be described. Although connections are not shown between the components illustrated in FIG. 8, the components can interact with each other to carry out device functions. In some embodiments, for example, the components are arranged so as to communicate via one or more busses (not shown). It should be understood that FIG. 8 and the following description are intended to provide a general understanding of a suitable environment in which various aspects of embodiments can be implemented.

As illustrated in FIG. 8, the MD 800 includes a display 802 for displaying data including, but not limited to, graphical user interface ("GUI") elements, text, images, video, virtual keypads and/or keyboards, messaging data, notification messages, metadata, internet content, device status, time, date, calendar data, device preferences, map and location data, profile selection (e.g., loud or silent mode), and the like. The MD 800 also includes a processor 804 for processing data and/or executing computer-executable instructions of one or more applications 806 stored in a memory 808. In some embodiments, the applications 806 include a user interface ("UI") application 810. The UI application 810 interfaces with a client application 812 (e.g., an operating system) to facilitate user interaction with device functionality and data. In some embodiments, the client application 812 is one of SYMBIAN OS from SYMBIAN LIMITED, WINDOWS MOBILE OS from MICROSOFT CORPORATION, WINDOWS PHONE OS from MICROSOFT CORPORATION, PALM WEBOS from HEWLETT PACKARD CORPORATION, BLACKBERRY OS from RESEARCH IN MOTION LIMITED, IOS from APPLE CORPORATION, and ANDROID OS from GOOGLE INC. These operating systems are merely exemplary of the operating systems that may be used in accordance with the embodiments disclosed herein.

The UI application 810 aids a user in activating service over-the-air, if applicable, entering message content, viewing received messages, answering/initiating calls, entering/deleting data, entering and setting user IDs and passwords for device access, configuring settings, manipulating address book content and/or settings, multimode interaction, interacting with other applications 814, and otherwise facilitating user interaction with the client application 812 and/or the other applications 814.

In some embodiments, the other applications 814 include, for example, visual voicemail applications, messaging applications, presence applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The other applications 814 may also include an application configured with instructions for performing the algorithms described above with respect to the methods 400, 500. The applications 806 are stored in the memory 808 and/or in a firmware 816, and are executed by the processor 804. The firmware 816 may also store code for execution during device power up and power down operations.

The MD 800 also includes an input/output ("I/O") interface 818 for the input/output of data such as location information, presence status information, user IDs, passwords, and application initiation (start-up) requests. In some embodiments, the I/O interface 818 is a hardwire connection such as a universal serial bus ("USB"), mini-USB, micro-USB, audio jack, PS2, IEEE 1394, serial, parallel, Ethernet (RJ48) port, RJ8 port, proprietary port, combinations thereof, or the like. In some embodiments, the MD 800 is configured to synchronize with another device (e.g., a computer) to transfer content stored to/from the MD 800. In some embodiments, the MD 800 is configured to receive updates to one or more of the applications 806 via the I/O interface 818. In some embodiments, the I/O interface 818 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 818 may be used for communications between the MD 800 and a network device or local device instead of, or in addition to, a communications component 820.

The communications component 820 interfaces with the processor 804 to facilitate wireless communications with one or more networks such as a cellular network and/or other networks. In some embodiments, other networks include networks that utilize non-cellular wireless technologies such as WIFI or WIMAX. In some embodiments, the communications component 820 includes a multimode communications subsystem for facilitating communications via the cellular network and one or more other networks.

The communications component 820, in some embodiments, includes one or more transceivers each configured to communicate over the same or a different wireless technology standard. For example, the transceivers of the communications component 820 may be configured to communicate using Global System for Mobile communications ("GSM"), CDMAONE, CDMA2000, Long Term Evolution ("LTE"), and various other 2G, 2.5G, 3G, 4G, and greater generation technology standards. Moreover, the communications component 820 may facilitate communications over various channel access methods (which may or may not be used by the aforementioned standards) including, but not limited to, Time Division Multiple Access ("TDMA"), Frequency Division Multiple Access ("FDMA"), W-CDMA, Orthogonal Frequency Division Multiplexing ("OFDM"), Space Division Multiple Access ("SDMA"), and the like. In addition, the communications component 820 may facilitate data communications using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA "HSPA+"), and various other current and future wireless data access standards.

In the illustrated embodiment, the communications component 820 includes a first cellular transceiver 822 that operates in one mode (e.g., GSM), and an $N^{th}$ cellular transceiver 824 operates in a different mode (e.g., UMTS). While only two cellular transceivers 822, 824 are illustrated, it should be appreciated that more than two transceivers can be included in the communications component 820.

The illustrated communications component 820 also includes an alternative communications transceiver 826 for use by other communications technologies including WIFI, WIMAX, BLUETOOTH, infrared, infrared data association ("IRDA"), near field communications ("NFC"), other RF, combinations thereof, and the like. In some embodiments, the communications component 820 also facilitates reception from terrestrial radio networks, digital satellite radio networks, internet-based radio service networks, combinations thereof, and the like.

The communications component 820 processes data from a network such as an internet, an intranet, a home broadband network, a WIFI hotspot, and the like, via an internet service provider ("ISP"), digital subscriber link ("DSL") provider, or broadband provider.

Audio capabilities for the MD 800 may be provided by an audio I/O component 828 that includes a speaker for the output of audio signals and a microphone to collect audio signals.

The illustrated MD 800 also includes a USIM system 830 that includes a SIM slot interface 832 for accommodating a USIM card. In some embodiments, the USIM system 830 is configured to accept insertion of other SIM cards for access to other network types such as GSM. In other embodiments, the USIM system 830 is configured to accept multiple SIM cards. In still other embodiments, the USIM system 830 is configured to accept a universal integrated circuit card ("UICC") with one or more SIM applications stored thereupon.

The MD 800 may also include an image capture and processing system 834 ("image system"). Photos may be obtained via an associated image capture subsystem of the image system 834, for example, a camera. The MD 800 may also include a video system 836 for capturing, processing, recording, and/or modifying video content. Photos and videos obtained using the image system 834 and the video system 836, respectively, may be added as message content to a multimedia messaging service ("MMS") message and sent to another mobile device.

The illustrated MD 800 also includes a location component 838 for sending and/or receiving signals such as global positioning system ("GPS") data, assisted GPS ("A-GPS") data, WIFI/WIMAX and/or cellular network triangulation data, combinations thereof, and the like, for determining a location of the MD 800. The location component 838 may communicate with the communications component 820 to retrieve triangulation data for determining a location of the MD 800. In some embodiments, the location component 838 interfaces with cellular network nodes, telephone lines, satellites, location transmitters and/or beacons, wireless network transmitters and receivers, combinations thereof, and the like. In some embodiments, the location component 838 includes one or more sensors such as a compass, an accelerometer, and/or a gyroscope to determine the orientation of the MD 800. Using the location component 838, the MD 800 can generate and/or receive data to identify its location, or transmit data used by other devices to determine the location of the MD 802. The location component 838 may include multiple components for determining the location and/or orientation of the MD 800.

The illustrated MD 800 also includes a power source 840, such as one or more batteries and/or other power subsystem (AC or DC). The power source 840 may interface with an external power system or charging equipment via a power I/O component 842.

As used herein, communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the MD 800. For purposes of the claims, the phrase "computer storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the MD 800 in order to store and execute the software components presented herein. It is also contemplated that the MD 800 may not include all of the components shown in FIG. 8, may include other components that are not explicitly shown in FIG. 8, or may utilize an architecture completely different than that shown in FIG. 8.

Based on the foregoing, it should be appreciated that technologies for establishing secure links between wireless devices in close proximity using ambient wireless signals have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A method for establishing secure links between devices, the method comprising:
    obtaining measurements of a wireless channel at a first wireless device that is within a proximity of a second wireless device;
    calculating a coherence time ($T_c$) of the wireless channel using the measurements;
    determining relative minima and relative maxima in the measurements;
separating each successive one of the relative minima and the relative maxima by the coherence time;
    determining a time index at which each of the relative minima and the relative maxima occurs;
    creating a list of time indices comprising the time index at which each of the relative minima and the relative maxima occurs;
    extracting a first bit sequence from the measurements of the wireless channel;
    wherein obtaining the measurements of the wireless channel comprises sampling an ambient wireless signal from a source and obtaining the measurements using a sample derived from the sampling, and wherein extracting the first bit sequence from the measurements comprises demodulating the ambient wireless signal using the sample to derive a demodulated signal;
    sending the list of time indices and a code-offset with respect to an error-correcting code to the second wireless device over an insecure connection between the first wireless device and the second wireless device, the error-correcting code being known to the first wireless device and the second wireless device prior to the code-offset being sent; and
    establishing a secure link between the first wireless device and the second wireless device using the first bit sequence as a shared key, the first bit sequence being known to the second wireless device based upon the second wireless device using the list of time indices, the code-offset, the error-correcting code, and a second bit sequence extracted by the second wireless device to derive the first bit sequence as the shared key.

2. The method of claim 1, further comprising:
    extracting the first bit sequence from the measurements of the wireless channel using the $T_{sub.c}$ to ensure that each successive bit of the first bit sequence is extracted from particular measurements of the measurements that are separated in time by at least $T_{sub.c}$.

3. The method of claim 2, further comprising sending a snippet of the demodulated signal to the second wireless device to synchronize a first time-frame of the first wireless device to a second time-frame of the second wireless device, and wherein sending the list of time indices and the code-offset with respect to the error-correcting code to the second wireless device over the insecure connection between the first wireless device and the second wireless device comprises sending a function of the first bit sequence to be used by the second wireless device to extract the second bit sequence, the second bit sequence being the same as the first bit sequence.

4. The method of claim 1, wherein extracting the first bit sequence from the measurements comprises extracting the first bit sequence from amplitude measurements of the measurements.

5. The method of claim 1, wherein extracting the first bit sequence from the measurements comprises extracting the first bit sequence from phase measurements of the measurements.

6. The method of claim 1, further comprising discarding a portion of the first bit sequence to eliminate information that may have leaked during sending the list of time indices and the code-offset over the insecure connection.

7. The method of claim 1, wherein obtaining the measurements of the wireless channel comprises sampling the ambient wireless signal from the source to derive the sample and processing the sample to isolate a time-varying portion of the ambient wireless signal.

8. The method of claim 7, wherein obtaining the first bit sequence from the measurements of the wireless channel comprises obtaining the first bit sequence from a phase component of the wireless channel.

9. The method of claim 7, wherein obtaining the first bit sequence from the measurements of the wireless channel comprises obtaining the first bit sequence from an amplitude component of the wireless channel.

10. The method of claim 7, wherein the source is a source selected from a group of sources consisting of a WIFI access point, a frequency modulation radio broadcast, a television signal broadcast, and a cellular network.

11. The method of claim 7, wherein the source is controlled by an adversary attempting to intercept data exchanged between the first wireless device and the second wireless device.

12. The method of claim 7, wherein the proximity of the first wireless device to the second wireless device is less than $\lambda/2$ of the ambient wireless signal.

13. A computer storage device storing computer-readable instructions stored thereupon that, when executed by a first wireless device, cause the first wireless device to perform operations comprising:

obtaining measurements of a wireless channel at the first wireless device, the first wireless device being within a proximity of a second wireless device;

calculating a coherence time of the wireless channel using the measurements; determining relative minima and relative maxima in the measurements;

separating each successive one of the relative minima and the relative maxima by the coherence time;

determining a time index at which each of the relative minima and the relative maxima occurs;

creating a list of time indices comprising the time index at which each of the relative minima and the relative maxima occurs;

extracting a first bit sequence from the measurements of the wireless channel;

wherein obtaining the measurements of the wireless channel comprises sampling an ambient wireless signal from a source and obtaining the measurements using a sample, and wherein extracting the first bit sequence from the measurements comprises demodulating the ambient wireless signal using the sample to derive a demodulated signal;

sending the list of time indices and a code-offset with respect to an error-correcting code to the second wireless device over an insecure connection between the first wireless device and the second wireless device, the error-correcting code being known to the first wireless device and the second wireless device prior to the code-offset being sent; and establishing a secure link between the first wireless device and the second wireless device using the first bit sequence as a shared key, the first bit sequence being known to the second wireless device based upon the second wireless device using the list of time indices, the code-offset, the error-correcting code, and a second bit sequence to derive the first bit sequence as the shared key.

14. The computer storage device of claim 13, further comprising:

extracting the first bit sequence from the measurements of the wireless channel using the $T_c$ to ensure that each successive bit of the first bit sequence is extracted from particular measurements of the measurements that are separated in time by at least $T_c$.

15. The computer storage device of claim 14, wherein the operations further comprise discarding a portion of the first bit sequence to eliminate information that may have leaked during sending the list of time indices and the code-offset over the insecure connection.

16. The computer storage device of claim 14, wherein the proximity of the first wireless device to the second wireless device is less than $\lambda/2$ of the ambient wireless signal.

17. A first wireless device configured to establish a secure link with a second wireless device, the first wireless device being within a proximity of the second wireless device, the first wireless device comprising:

a processor; and a memory storing instructions that, when executed by the processor, cause the processor to perform operations comprising:

obtaining measurements of a wireless channel;

calculating a coherence time ($T_c$) of the wireless channel using the measurements;

determining relative minima and relative maxima in the measurements;

separating each successive one of the relative minima and the relative maxima by the coherence time;

determining a time index at which each of the relative minima and the relative maxima occurs;

creating a list of time indices comprising the time index at which each of the relative minima and the relative maxima occurs;

extracting a first bit sequence from the measurements of the wireless channel;

wherein the operations further comprise sampling an ambient wireless signal from a source and obtaining the measurements using a sample, and wherein extracting the first bit sequence from the measurements comprises demodulating the ambient wireless signal using the sample to derive a demodulated signal;

sending the list of time indices and a code-offset with respect to an error-correcting code to the second wireless device over an insecure connection between the first wireless device and the second wireless device, the error-correcting code being known to the first wireless device and the second wireless device prior to the code-offset being sent; and establishing a secure link between the first wireless device and the second wireless device using the first bit sequence as a shared key, the first bit sequence being known to the second wireless device based upon the second wireless device using the list of time indices the code-offset, the error-correcting code, and a second bit sequence to derive the first bit sequence as the shared key.

18. The first wireless device of claim 17, further comprising:

extracting the first bit sequence from the measurements of the wireless channel using the $T_c$ to ensure that each successive bit of the first bit sequence is extracted from particular measurements of the measurements that are separated in time by at least $T_c$.

19. The first wireless device of claim 18, wherein the instructions further comprise discarding a portion of the first bit sequence to eliminate information that may have leaked during sending the list of indices and the code-offset over the insecure connection.

20. The first wireless device of claim 19, wherein the proximity of the first wireless device to the second wireless device is less than $\lambda/2$ of the ambient wireless signal.

* * * * *